United States Patent [19]

Berg, III

[11] Patent Number: 5,263,351

[45] Date of Patent: Nov. 23, 1993

[54] LOCKING WEDGE ASSEMBLY FOR TWO-PIECE MECHANICALLY CONNECTED MANDRELS

[75] Inventor: William W. H. Berg, III, Pittsburgh, Pa.

[73] Assignee: Italimpianti of America, Inc., Coraopolis, Pa.

[21] Appl. No.: 937,944

[22] Filed: Sep. 1, 1992

[51] Int. Cl.⁵ ............................................. B21B 17/10
[52] U.S. Cl. .................................... 72/208; 279/2.11; 403/374
[58] Field of Search ............... 408/23 RR, 226, 240; 279/2.11, 66, 67, 68; 403/374, 409.1, 355, 343, 378; 72/208

[56] References Cited

U.S. PATENT DOCUMENTS

| | | | |
|---|---|---|---|
| 2,167,014 | 7/1939 | Verderber | 279/83 |
| 2,351,710 | 6/1944 | Sanders | 205/8 |
| 2,774,603 | 12/1956 | Jackson | 279/97 |
| 2,816,770 | 12/1957 | Vlieg et al. | 279/97 |
| 3,215,445 | 11/1965 | Benjamin et al. | 279/97 |
| 3,901,063 | 8/1975 | Nileshwar | 72/283 |
| 4,025,213 | 5/1977 | Schäfer et al. | 403/374 |
| 4,057,992 | 11/1977 | Willimzik | 72/283 |
| 4,161,112 | 7/1979 | Stump | 72/283 |
| 4,344,724 | 8/1982 | Kress et al. | 408/239 R |
| 4,573,824 | 5/1986 | Ehle | 279/67 |
| 4,611,960 | 9/1986 | Quenneville et al. | 279/67 |
| 4,684,302 | 8/1987 | George | 408/239 R |
| 4,745,787 | 5/1988 | Sansome et al. | 72/41 |
| 4,829,862 | 5/1989 | Keritsis | 408/239 R |
| 4,832,546 | 5/1989 | Potemkin | 409/234 |

FOREIGN PATENT DOCUMENTS 2613309  9/1977  Fed. Rep. of Germany.

Primary Examiner—Lowell A. Larson
Assistant Examiner—Michael J. McKeon
Attorney, Agent, or Firm—Webb, Burden, Ziesenheim & Webb

[57] ABSTRACT

A two-piece, mechanically connected mandrel assembly in which a locking wedge assembly serves to secure a tapered socket connection. The wedge assembly includes two long wedge segments, two short wedge segments, a bolt connecting the short wedge segments and a locking device to fix the bolt after proper torquing to secure the assembly. The two-piece, mechanically connected mandrel assembly is useful in the rolling or drawing of steel tubing or other metal constructs, and the four-piece locking wedge assembly both provides a secure connection and permits ready replacement of a worn work bar with a new work bar.

11 Claims, 2 Drawing Sheets

LOCKING WEDGE ASSEMBLY FOR TWO-PIECE MECHANICALLY CONNECTED MANDRELS

FIELD OF THE INVENTION

The invention relates to the rolling or drawing of steel tubing, and specifically pertains to improved fastening means between the dummy bar and the work bar of a two-piece mechanically connected mandrel assembly for such rolling or drawing.

BACKGROUND OF THE INVENTION

Mandrels are essential tools in rolling and drawing steelmaking applications. As only one of many examples, mandrels can be used in cold drawing of tubular steel and other metal products. Cold drawing accomplishes the reduction of both the diameter and the wall thickness of a tube. Cold drawing of a tube through a fixed cold reduction die without an internal mandrel is called sinking, or sink drawing, in which only the diameter of the tube is reduced. When both wall thickness and tube diameter are to be reduced, it is more usual to place a mandrel within the tube prior to drawing the tube through a fixed cold reduction die.

Many steelmaking applications other than cold drawing, however, make use of mandrels for the shaping of steel and other metals. For example, mandrels are used for the hot rolling of steel pipe and, more specifically, are useful in a "cross rolling" mill where the mandrel rotates during processing. Mandrels are also used for "straight" rolling, and these mills are often referred to as mandrel mills.

Mandrels of this type are often of two-piece construction so that a dummy bar serves to give the assembly the required length and the attached work bar serves as the actual working part. After a certain period of use, the work bar must be replaced due to wear. The original welded assembly of most two-piece mandrels were traditionally quickly replaced by more convenient fastening arrangements such as by the use of screw threads or a simple pin. A number of prior art U.S. patents show work bars attached to dummy bars in this way, and these patents include U.S. Pat. No. 2,351,710 to Sanders, U.S. Pat. No. 3,901,063 to Nileshwar, U.S. Pat. No. 4,057,992 to Willimzik, U.S. Pat. No 4,161,112 to Stump and U.S. Pat. No. 4,745,787 to Sansome et al.

Unfortunately, prior art fasteners for two-piece, mechanically connected mandrels have never been adequately designed either to assure precise fitting or to provide the surface mating required to withstand and to transmit the forces incurred during normal mandrel operation. Torque-withstanding fasteners are particularly required in cross rolling applications when the mandrel must withstand rotation during use. A need thus remains for a precise fitting, force-withstanding connection between the dummy bar and the work bar segments of a mechanically connected mandrel assembly.

SUMMARY OF THE INVENTION

In order to meet this need, the present invention is a two-piece, mechanically connected mandrel assembly in which a locking wedge assembly, comprising four cooperating wedges, serves to secure a tapered socket connection. Along with maintaining a precise and compressive fit, the wedge assembly also transmits torque and other forces between the work and dummy bars. The wedge assembly includes two long wedge segments, two short wedge segments, a bolt connecting the short wedge segments and a locking device to secure the bolt after proper torquing to secure the assembly.

DETAILED DESCRIPTION OF THE INVENTION

Figure 1:
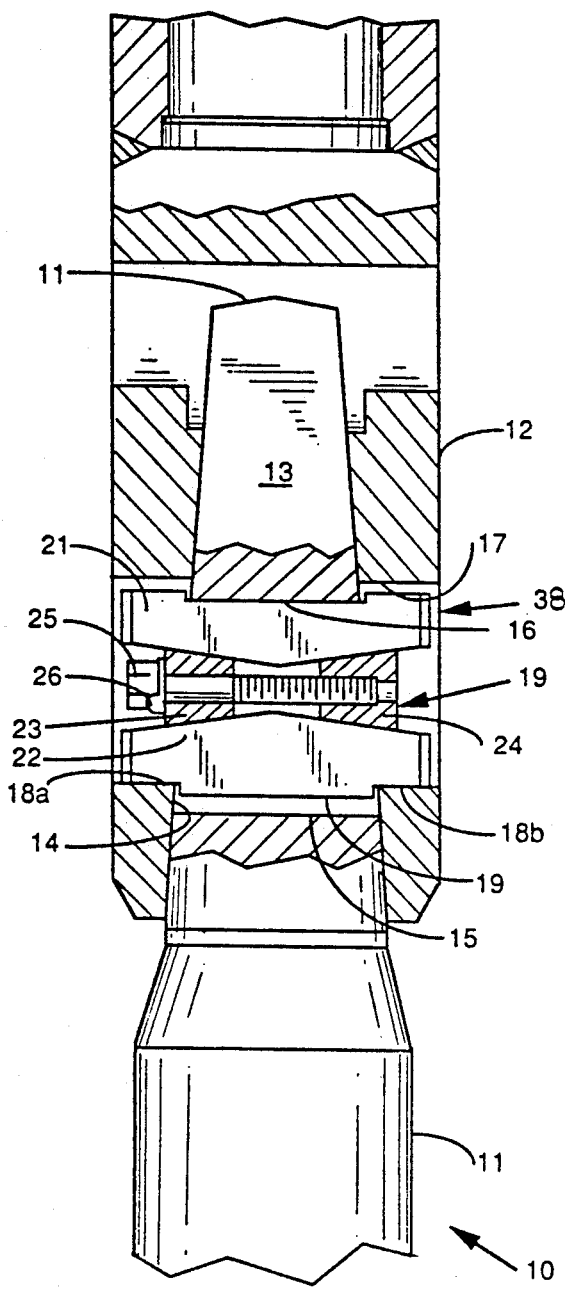
FIG. 1 is a sectional view showing the locking wedge assembly securing the tapered socket to the dummy bar.
Figure 2:
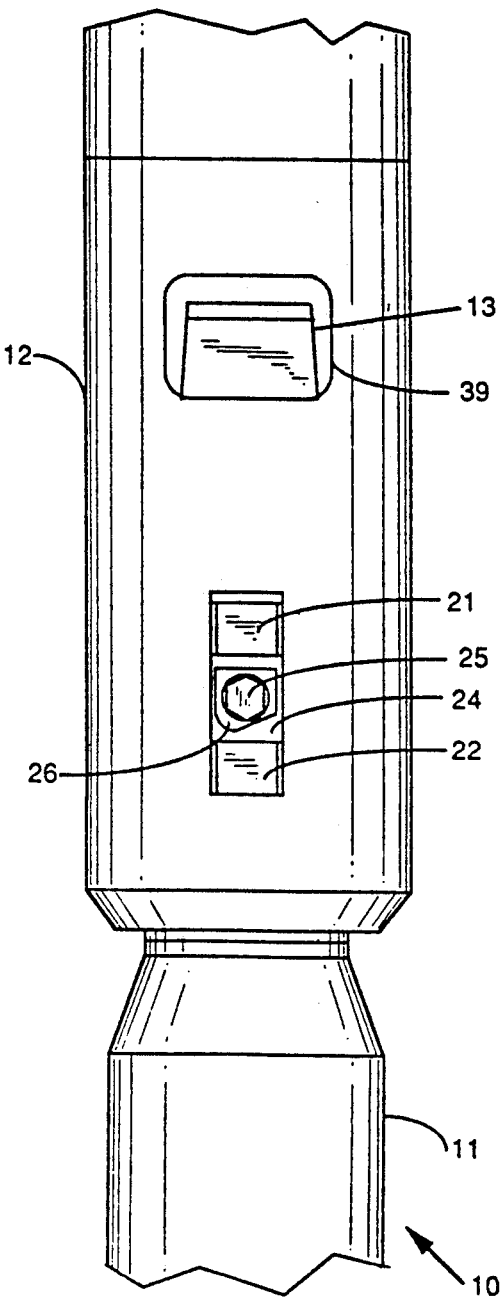
FIG. 2 is a plan view of the assembled work bar and dummy bar of FIG. 1.

According to a preferred embodiment of this invention, there is provided a mechanically connected mandrel for the rolling or drawing of metal products. Referring to FIGS. 1 and 2, the mandrel assembly 10 comprises a work bar 11 and dummy bar 12 releasably secured together. The work bar 11 comprises a bar having a longitudinal axis and having a tapered end 13 most preferably defined by a conical surface, the conical axis of which is aligned with longitudinal axis of the work bar 11. The dummy bar 12 comprises a bar for supporting the work bar in position. The work bar has a longitudinal axis and a tapered bore 14, most preferably defined by a conical surface, the conical axis of which is aligned with the longitudinal axis of the dummy bar. The tapered end 13 of the work bar 11 is configured to seat in the tapered bore 14 of the dummy bar 12.

The work bar is provided with a slot 15 therethrough that extends transversely through the tapered or conical end. The slot has a flat bearing surface 16 which is substantially perpendicular to the axis of the tapered or conical end surface. Surface 16 faces toward the large end of the tapered or conical end surface.

The dummy bar 12 is provided with a slot 17 therethrough that extends transversely through the bore 14. The slot has flat bearing faces 18a and 18b which are substantially perpendicular to the axis of the bore surface. Surfaces 18a and 18b face toward the small end of the bore 14.

The slots 15, 17 in the work bar and the dummy bar are overlapped and offset when the end surface of the work bar is seated in the bore of the dummy bar to form slot 38. A locking wedge assembly 19 fits within the slot 38.

Figure 3:
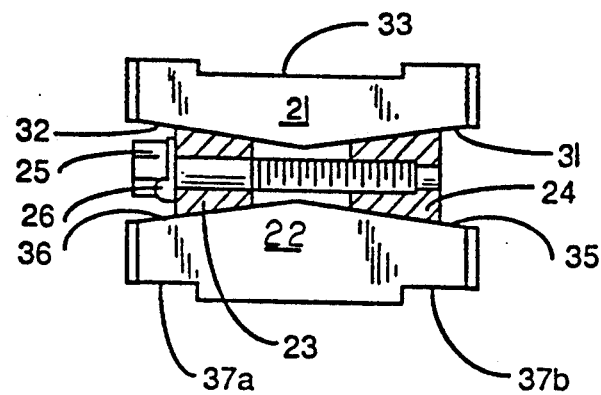
FIG. 3 illustrates the locking wedge assembly.

Referring to FIG. 3, locking wedge assembly 19 comprising two long wedges 21, 22 each having two wedge surfaces 31, 32, 35, 36 inclined at an obtuse angle. The wedge surfaces of each long wedge face each other. The locking wedge assembly further comprises two short wedges 23, 24 each having two wedge surfaces inclined at an acute angle complementary to the obtuse angle of the long wedge faces. One long wedge 21 has a flat base surface 33 for abutting the bearing surface 16 defined by the slot in the work bar. The other long wedge 22 has flat base surfaces 37a, 37b for abutting the bearing surfaces 18a and 18b defined by the slot in the dummy bar. A bolt 25 or other fastener is arranged to draw the short wedges 23, 24 together to cause the respective bearing surfaces of the long wedges 21, 22 to be forced apart thus forcing the seated surfaces on the work bar and the dummy bar together. The compressive fit thus provided insures transmission of torque and other forces between the dummy bar and the work bar.

The locking wedge assembly 19 includes the two long wedge segments 21 and 22, the two short wedge segments 23 and 24, the bolt 25 and a lock washer 26. The short wedge segments 23 and 24 each have a bore therein for receiving the fastener, one bore may be threaded, for example, or both may be threaded if one bore has left turn threads and the other bore has right turn threads, as with a turn buckle. The collapsed wedge assembly 19 fits within a three-dimensionally rectangular slot 38 formed when slots in the dummy bar 12 and the work bar 11 are overlapped.

The long wedge 21 has an indentation central to its base and the indentation mates with the bearing surface 16 of the slot in the work bar. The long wedge 22 has a protrusion central to its base which fits within a corresponding space on the dummy bar 12, while the bearing surfaces 37a, 37b on each side of the protrusion mate with the bearing surfaces 18a and 18b of the slot in the dummy bar.

As shown in FIG. 1, the two long wedges 21 and 22 have a peaked shape and are disposed within the slot 38 in a position so that the peaks of the long wedges face each other. The short wedges 23 and 24 are interposed between the long wedges 21 and 22 so that the narrow ends of the short wedges 23 and 24 face each other and so that the short wedges are positioned equidistant from the facing peaks. The bolt 25 and its associated lock washer 26 adjustably connect the short wedges.

In operation, as the bolt 25 is tightened, the long wedges 21 and 22 and the short wedges 23 and 24 compress into the locked, expanded configuration which holds the work bar 11 securely to the dummy bar 12. This fastening is actually a tight compression of the locking wedge assembly 19 within the slot 38. The nature of this compression fit provides the mated surface area required to withstand and to transmit the forces incurred during normal operation of the two-piece mechanically connected mandrel assembly 10. Whereas a two-piece wedge assembly can guarantee only one zone of contact, the locking wedge assembly 19 assures, both by its design and together with accurate machining, four zones of contact among the locking wedge assembly 19, the dummy bar 12 and the work bar 11.

When the work bar 11 becomes worn, the work bar 11 may be disengaged from the dummy bar 12 by loosening the bolt 25. It should be noted that all wedge and tapered surfaces of the present two-piece, mechanically connected mandrel assembly should be coated with high temperature/high pressure anti-seize compound to preserve removability of the work bar 11 from the dummy bar 12. Access to the bolt 25 and the lock washer 26 may be gained through slot 38. An access aperture 39 is provided in the dummy bar 12; this access aperture 39 permits a tool (usually hydraulic, although possibly a pneumatic or a hand tool) to be inserted to pry the tapered end 13 of the work bar 11 in a direction away from the dummy bar 12, as an auxiliary disengagement mechanism should the standard anti-seize compound alone prove insufficient.

Although the dummy bar 12 and the work bar 11 may be fabricated of alloys and materials typical to such constructs, the long wedges 21 and 22 and the short wedge segments 23 and 24 of the present invention, together with the bolt 25, are constructed of heat-treated alloy steel so as to render them able to withstand the forces of normal operation during repeated, protracted use of the work bar.

Although the lengths of the work bar 11 and/or dummy bar 12 are peripheral to the present invention, the secure locking connection afforded by the locking wedge assembly 19 is especially advantageous when the work bar 11 is of considerable length. Torque and other rotational forces exerted by long work bars such as the work bar 11 can be difficult to contain within a simple mechanical connection. The complex mechanical connection of the present locking wedge assembly 19 provides a connection which can withstand even the high torque associated with long work bars.

Figure 4:
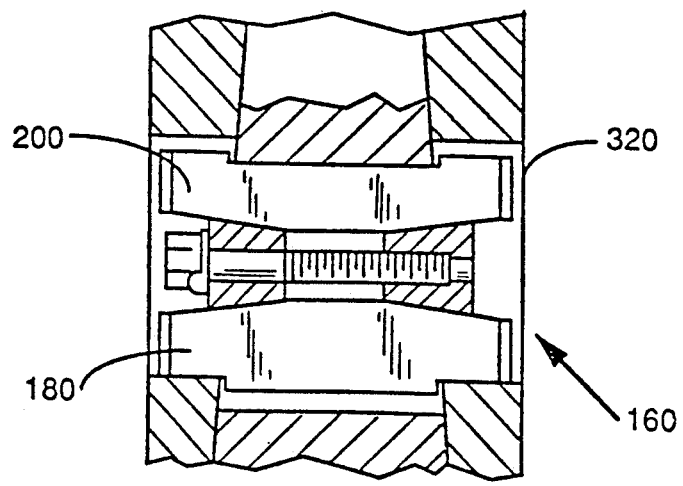
FIG. 4 is a partial sectional view showing the locking wedge assembly according to an alternate embodiment of the invention.

Although dimensions are not critical to the practice of the present invention, typical dimensions are exemplified as follows. It must be stressed that the following dimensions are typical, because there are no required dimensions and final size is dependent upon many factors depending upon the final dimensions of the metal product to be milled or drawn. In a two-piece mechanically connected mandrel in which the work bar (not the tapered end) is 3 to 10 inches in diameter, the work bar will typically be 48 inches in length (not illustrated) and the engaged tapered segment will have a length on the order of two bar diameters for a total work bar length of 54.10 inches. The dummy bar has the same diameter as the work bar, namely, 3 to 10 inches, and the slot 38 extending through the work bar and the tapered end of the work bar is in appropriate portion to the bar diameter. A typical dummy bar is 288 inches or greater in length for a total length of the assembled two-piece mechanically connected mandrel of 342 inches or greater. As shown in FIG. 4, the two long wedges 180 and 200 have an oblated rhombic prismoid shape and are disposed within the slot 320 in a position so that the oblated flats of the long wedges face each other.

Although the invention has been described with particularity above, with reference to specified dimensions and particular materials, the invention is to be limited only insofar as is set forth in the accompany claims.

I claim:

1. A mechanically connected mandrel for the rolling or drawing of metal products comprising:
   a work bar comprising a bar having a predominantly cylindrical shape and having a tapered end thereto;
   a dummy bar comprising a bar having a tapered aperture in one end thereof, said tapered aperture being adapted to receive said tapered end of said work bar;
   a slot which extends through both said tapered end and said dummy bar when said tapered end is disposed within the tapered aperture of said dummy bar; and
   a locking wedge assembly comprising two long wedges having inclined surfaces which face each other, two short wedges interposed between said two long wedges, and a bolt connecting said two short wedges;
   wherein said locking wedge assembly is disposed within said slot and expands upon tightening of said bolt to secure said work bar to said dummy bar.

2. The mechanically connected mandrel according to claim 1 wherein said two short wedges are connected by a bolt and lock washer.

3. The mechanically connected mandrel according to claim 2 wherein said two short wedges have co-linear apertures therein.

4. The mechanically connected mandrel according to claim 3 wherein the first short wedge is positioned adjacent the head of said bolt and wherein said second short wedge is positioned adjacent the tip of said bolt.

5. The mechanically connected mandrel according to claim 4 wherein said two long wedges have peaks which face each other, said peaks being formed by the intersection of the two inclined surfaces of the two long wedges.

6. The mechanically connected mandrel according to claim 5 wherein said short wedges are identical in exterior shape and wherein said long wedges are identical in the exterior shape of the peaks thereon.

7. The mechanically connected mandrel according to claim 6 wherein said slot is a three-dimensionally rectangular slot.

8. A mechanically connected mandrel for the rolling or drawing of metal products comprising:
   a work bar comprising a bar having a predominately cylindrical shape and having a tapered end thereto;
   a dummy bar comprising a bar having a tapered aperture in one end thereof, said tapered aperture being adapted to receive said tapered end of said work bar;
   a slot which extends through both said tapered end and said dummy bar when said tapered end is disposed within the tapered aperture of said dummy bar; and
   a locking wedge assembly comprising two long wedges having inclined surfaces which face each other, two short wedges interposed between said two long wedges, and a bolt connecting said two short wedges;
   wherein said locking wedge assembly is disposed within said slot and expands upon tightening of said bolt to secure said work bar to said dummy bar, and wherein one of said long wedges has an indentation therein and wherein the second of said long wedges has a protrusion thereon.

9. The mechanically connected mandrel according to claim 8 wherein said long wedge having an indentation therein carries said indentation on the surface of said long wedge opposite said inclined surfaces and wherein said second long wedge having said protrusion thereon carries said protrusion on the face of said second long wedge opposite the inclined surfaces of said second long wedge.

10. A mechanically connected mandrel for the rolling or drawing of metal products comprising:
    a work bar comprising a bar having a longitudinal axis and having a tapered end defined by surfaces tapering to the longitudinal axis of the work bar,
    a dummy bar comprising a bar for supporting the work bar in position, said work bar having a longitudinal axis and having a tapered bore defined by surfaces tapering to the longitudinal axis of the dummy bar,
    said work bar having a slot therethrough that extends transversely through the tapered end, said slot having a flat bearing surface which is substantially perpendicular to the longitudinal axis of the work bar and facing toward the largest portion of the tapered end,
    said dummy bar having a slot therethrough that extends transversely through the tapered bore, said slot having a flat bearing face which is substantially perpendicular to the longitudinal axis of the dummy bar and facing toward the small end of the tapered bore,
    the slots in said work bar and said dummy bar being overlapping and offset when the tapered end surface of the work bar is seated in the tapered bore of the dummy bar,
    a locking wedge assembly comprising two wedges each having two wedge surfaces inclined at an obtuse angle, the wedge surfaces of each long wedge facing each other and two short wedges each having two wedge surfaces inclined at an acute angle complementary to the obtuse angle of the long wedge faces, one long wedge having a flat base surface for abutting the bearing surface defined by the slot in the work bar and the other long wedge having a flat base surface for abutting the bearing surface defined by the slot in the dummy bar, and means to draw the short wedges together to cause the respective bearing surfaces of the long wedges to be forced apart thus forcing the tapered surface on the work bar and the tapered surface in the dummy bar together.

11. A mechanically connected mandrel for the rolling or drawing of metal products comprising:
    a work bar comprising a bar having a longitudinal axis and having a tapered end defined by a conical surface the conical axis of which is aligned with longitudinal axis of the work bar,
    a dummy bar comprising a bar for supporting the work bar in position, said work bar having a longitudinal axis and having a tapered bore defined by a conical surface the conical axis of which is aligned with the longitudinal axis of the dummy bar,
    said work bar having a slot therethrough that extends transversely through the conical end, said slot having a flat bearing surface which is substantially perpendicular to the axis of the conical end surface and facing toward the large diameter end of the conical end surface,
    said dummy bar having a slot therethrough that extends transversely through the conical bore, said slot having a flat bearing face which is substantially perpendicular to the axis of the conical bore surface and facing toward the small diameter end of the conical bore,
    the slots in said work bar and said dummy bar being overlapping and offset when the conical end surface of the work bar is seated in the conical bore of the dummy bar,
    a locking wedge assembly comprising two long wedges each having two wedge surfaces inclined at an obtuse angle, the wedge surfaces of each long wedge facing each other and two short wedges each having two wedge surfaces inclined at an acute angle complementary to the obtuse angle of the long wedge faces, one long wedge having a flat base surface for abutting the bearing surface defined by the slot in the work bar and the other long wedge having a flat base surface for abutting the bearing surface defined by the slot in the dummy bar, and means to draw the short wedges together to cause the respective bearing surfaces of the long wedges to be forced apart thus forcing the conical surface on the work bar and the conical surface in the dummy bar together.

* * * * *